(12) United States Patent
Boertlein

(10) Patent No.: US 8,128,031 B2
(45) Date of Patent: Mar. 6, 2012

(54) SPAR FOR SAILWINGS

(75) Inventor: Neil Thomas Boertlein, Vienna, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 857 days.

(21) Appl. No.: 12/139,373

(22) Filed: Jun. 13, 2008

(65) Prior Publication Data

US 2010/0001122 A1  Jan. 7, 2010

Related U.S. Application Data

(60) Provisional application No. 60/943,772, filed on Jun. 13, 2007.

(51) Int. Cl.
*B64C 3/18* (2006.01)

(52) U.S. Cl. .................... 244/123.1; 244/900

(58) Field of Classification Search ............... 244/123.1, 244/123.9, 900, 16, 35 R, 199.1, 199.3, 130, 244/38, 199.2
See application file for complete search history.

(56) References Cited

U.S. PATENT DOCUMENTS

| | | | |
|---|---|---|---|
| 1,048,835 A | 12/1912 | Hyde et al. | |
| 1,881,034 A | 10/1932 | Smith et al. | |
| D144,067 S | 3/1946 | Paglia | |
| 2,643,076 A | 6/1953 | Hurel | |
| 3,025,027 A | 3/1962 | Ferreira | |
| 3,089,670 A | 5/1963 | Johnson | |
| 3,561,702 A * | 2/1971 | Jones | 244/16 |
| 3,584,813 A * | 6/1971 | Sweeney et al. | 244/38 |
| 3,599,904 A * | 8/1971 | Condit et al. | 244/38 |
| 3,987,984 A * | 10/1976 | Fischer | 244/219 |
| 4,262,864 A | 4/1981 | Eshoo | |
| 4,330,100 A * | 5/1982 | Elber | 244/48 |
| 4,361,295 A | 11/1982 | Wenzel | |
| 4,364,532 A | 12/1982 | Stark | |
| 4,415,133 A | 11/1983 | Phillips | |
| 4,568,043 A * | 2/1986 | Schmittle | 244/900 |
| 4,667,898 A * | 5/1987 | Greenhalgh | 244/46 |
| 5,226,618 A * | 7/1993 | Greenhalgh | 244/130 |
| 5,634,613 A * | 6/1997 | McCarthy | 244/199.1 |
| 5,810,284 A | 9/1998 | Hibbs et al. | |
| 6,659,397 B1 * | 12/2003 | Charron | 244/72 |
| 6,970,773 B2 * | 11/2005 | Phillips | 701/7 |
| 7,198,225 B2 | 4/2007 | Lisoski et al. | |
| 2004/0118969 A1 * | 6/2004 | MacCready et al. | 244/5 |

OTHER PUBLICATIONS

"A Preliminary Study of Solar Powered Aircraft and Associated Power Trains: NASA Contract Report 3699"; David W. Hall, et al.; Dec. 1983; see pp. 118-124.
"Study of the Aerodynamics of a Small UAV Using AVL Software"; Paul Dorfman; Apr. 24, 2006.
"Gust Load Conditions for Fatigue Tests Based on a Continuous Gust Concept"; J.B. de Jonge, et al., Jan. 13, 1997.

* cited by examiner

*Primary Examiner* — Galen Barefoot
(74) *Attorney, Agent, or Firm* — Katten Muchin Rosenman LLP

(57) ABSTRACT

A sail wing for a lightweight aircraft comprising a membrane; a front spar; and a tensioned rear wire attached to a trailing edge of the membrane, such that when the front spar is bent to match a curve of the tensioned trailing edge of the sail wing membrane, the sail wing membrane has substantially little or no twist, and results in substantially little or no induced drag.

26 Claims, 7 Drawing Sheets

SPAR FOR SAILWINGS

PRIORITY

The present application claims priority under 35 U.S.C. §119(e) to U.S. Provisional Patent Application Ser. No. 60/943,772, filed Jun. 13, 2007, the entire contents of which are herein expressly incorporated by reference.

BACKGROUND OF THE INVENTION

1. Field of the Invention

The invention is related to light weight aircraft. More particularly, the invention is related to a system and method for eliminating, or substantially reducing, and controlling the twist of sailwings on lightweight aircraft.

2. Background Art

Previous attempts at using sailboat type membrane sails for aircraft wings have had major problems with controlling the twist of the wing. A large amount of spanwise tension is needed in the sail, particularly at the trailing edge to control the twist of the airfoil under load. The wing spar (mast) is well ahead of the centroid of the aerodynamic forces, and this results in a significant upload at the back of the sail. Normally this load is reacted out by trailing edge tension, resulting in a type of catenary curve. The higher the tension, the flatter this curve, but this gives a large aft bending moment in the spar. With tolerable spar loads, the wing might have over 10 degrees twist, which can give poor induced drag, as compared to a more normal wing.

Thus, a need exists for a wing structure on a light weight aircraft that can reduce the twist on the sailwing, thereby reducing induced drag, and increasing the available wing lift.

SUMMARY OF THE INVENTION

It is therefore a general aspect of the invention to provide a wing structure that will obviate or minimize problems of the type previously described.

According to a first aspect of the present invention, a sail wing for an aircraft is provided comprising a front spar; a sail wing membrane attached to the front spar; and a tensioned rear wire attached to a trailing edge of the sail wing membrane, such that when the front spar includes a bend that matches a curve of the tensioned trailing edge of the sail wing membrane, the sail wing membrane has substantially little or no twist along a span of the sail wing membrane.

According to the first aspect, the front spar comprises a composite material, the front spar comprises a metal material, and the front spar comprises a wood material.

According to the first aspect, the bend of the front spar is configured to substantially minimize induced drag that results from twisting of the sail wing membrane. According to the first aspect, the curve comprises a substantially catenary curve, the curve comprises a substantially parabolic curve, the curve comprises a substantially hyperbolic curve, and the curve comprises a substantially circular curve.

According to the first aspect, the curve comprises a curve that takes into account aircraft design criteria selected from the group consisting of aerodynamic loads, allowable tension in the tensioned rear wire, a type of material the sail wing is made of, one or more wing airfoils, and a twist in the wing.

According to the first aspect, the curve comprises a curve that takes into account aircraft design criteria comprising: aerodynamic loads; allowable tension in the tensioned rear wire; a type of material the sail wing is made of; one or more wing airfoils, and a twist in the wing.

According to a second aspect of the present invention, a lightweight aircraft is provided comprising: a fuselage; vertical control surfaces appended to the fuselage; horizontal control surfaces appended to the fuselage; and a wing structure appended to the fuselage, wherein the wing structure includes a front spar; a wing structure membrane attached to the front spar; and a tensioned rear wire attached to a trailing edge of the wing structure membrane, such that when the front spar is bent to match a curve of the tensioned trailing edge of the wing structure membrane, the wing structure membrane has substantially little or no twist.

According to the second aspect, the front spar comprises a composite material, the front spar comprises a metal material, and the front spar comprises a wood material.

According to the second aspect, the bend of the front spar is configured to substantially minimize induced drag that results from twisting of the wing structure membrane.

According to the second aspect, the curve comprises a substantially catenary curved shape, the curve comprises a substantially parabolic curved shape, the curve comprises a substantially hyperbolic curved shape, and the curve comprises a substantially circular curved shape.

According to the second aspect, the lightweight aircraft comprises a solar-powered aircraft, the lightweight aircraft comprises a glider, and the lightweight aircraft comprises an ultra-light aircraft.

According to the second aspect, the wing structure further comprises one or more additional tensioned rear wires attached to the trailing edge of the wing structure membrane.

According to third aspect of the present invention, a sail wing for an aircraft is provided comprising: a front spar; and a tensioned sail wing membrane attached to the front spar, such that when the front spar includes a bend that matches a curve of the tensioned trailing edge of the tensioned sail wing membrane, the tensioned sail wing membrane has substantially little or no twist along a span of the tensioned sail wing membrane.

According to the third aspect, the bend of the front spar is configured to substantially minimize induced drag that results from twisting of the tensioned sail wing membrane.

BRIEF DESCRIPTION OF THE DRAWINGS

The novel features and advantages of the present invention will best be understood by reference to the detailed description of the preferred embodiments that follows, when read in conjunction with the accompanying drawings, in which.

DETAILED DESCRIPTION OF THE PREFERRED EMBODIMENTS

Figure 1:
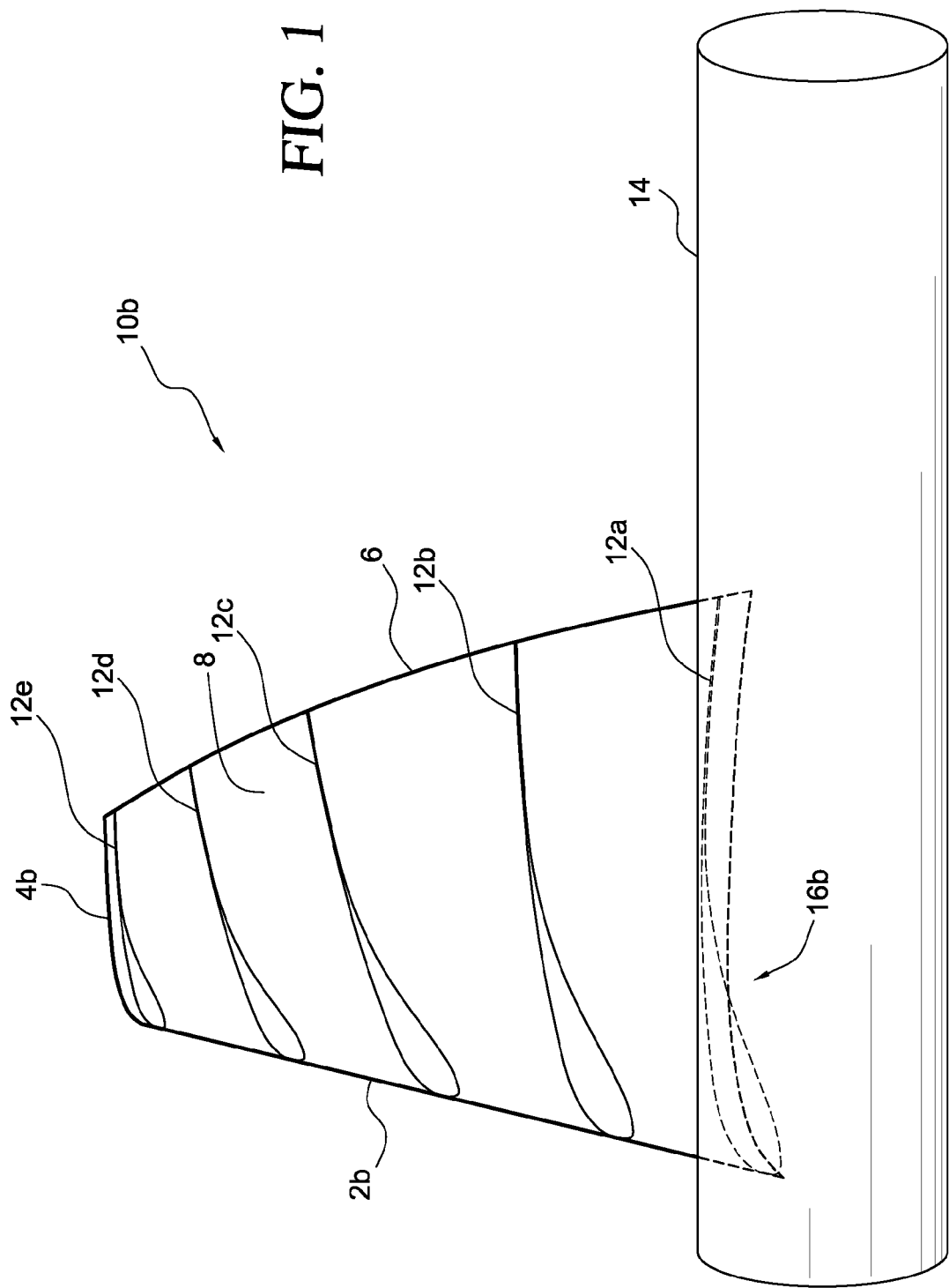
FIG. 1 illustrates an oblique view of a conventional sail wing from the root of the wing, with sample cross sections, showing how the trailing edge curve results in a substantial twist in the wing, which, in turn, results in poor aerodynamic performance.

The various features of the preferred embodiments will now be described with reference to the drawing figures, in which like parts are identified with the same reference characters. The following description of the presently contemplated best mode of practicing the invention is not to be taken in a limiting sense, but is provided merely for the purpose of describing the general principles of the invention.

Figure 4:
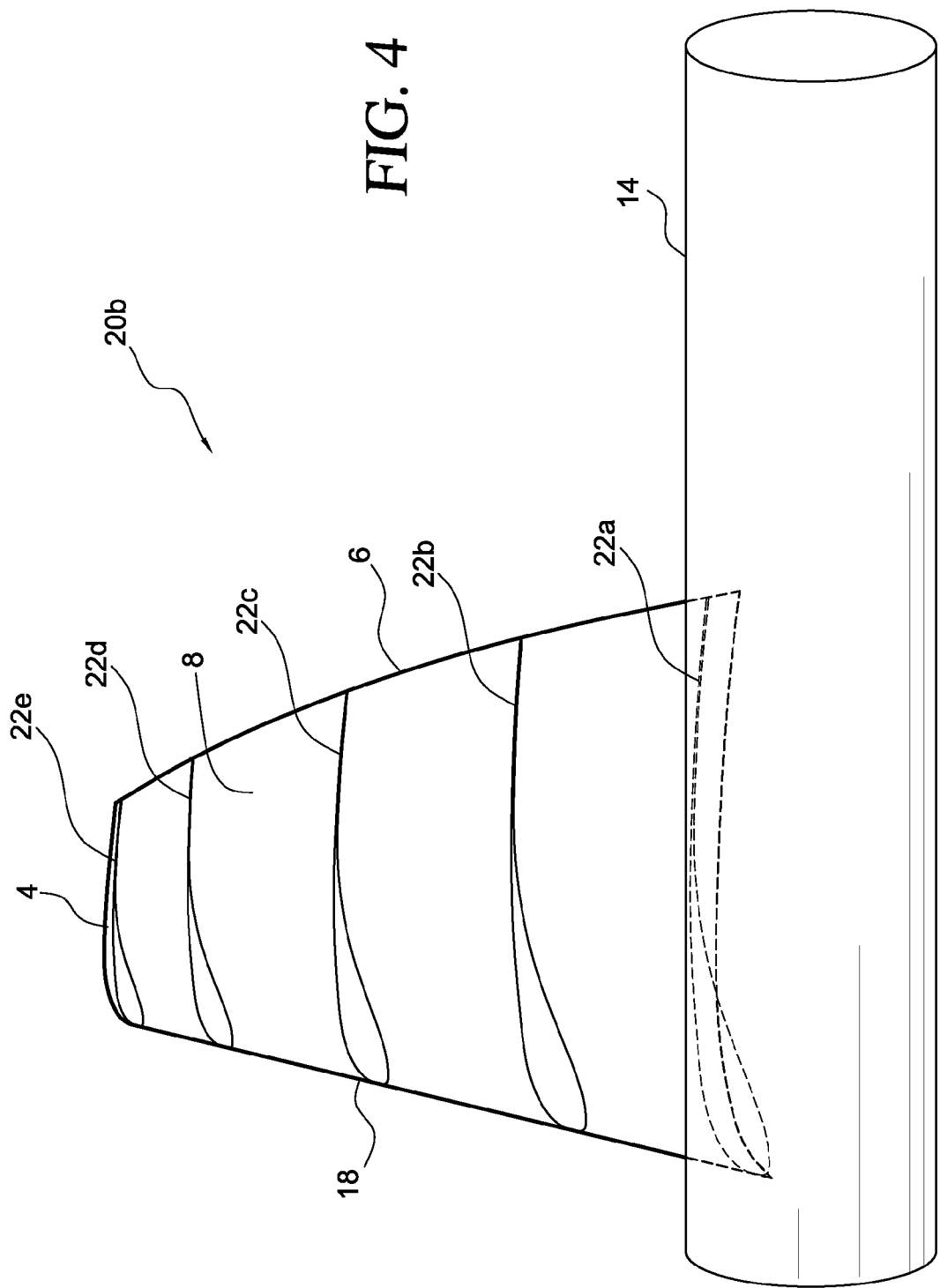
FIG. 4 illustrates an oblique view of a curved sail wing with a curved front spar, wherein the front spar is pre-curved to match the curve of a tensioned cable trailing edge according to an embodiment of the present invention.

Light weight aircraft 100, according to an exemplary embodiment, generally comprise aircraft that weigh less than or about 5,000 pounds. According to a further exemplary embodiment, most sail planes can generally be considered to be light weight aircraft, and comprise a wing structure made up of a front spar, a trailing edge cable, and sail wing material (typically a relatively thin membrane material). Other components of the light weight aircraft 100 include a fuselage, vertical and horizontal flight control surfaces, and in most instances, a cockpit (with flight controls located therein). According to an exemplary embodiment, the front spar is a curved front spar 18 that is curved to approximately match the curvature of trailing edge cable (cable) 6, producing moderate sail tension (as shown in FIG. 4). For the flight condition that matches the design trailing edge load, curved wing 20 will then have little or no twist (or whatever twist that was purposefully designed into curved wing 20). According to an exemplary embodiment, curved spar 18 can be fabricated out of many different type of materials, including metals (e.g., aluminum), wood, or other materials. According to a preferred embodiment, curved front spar 18 comprises composites molded into the proper shape, or, in the case of a curved folding spar, it can comprise piecewise linear approximations of the desired curve, made out of composite materials, with the angle changes incorporated into the hinges or telescoping joints. Furthermore, according to an exemplary embodiment, trailing edge cable 6 can be a wire or metal cable or a rope.

According to a further exemplary embodiment, lightweight aircraft 100 with curved spar 18 has the advantages of a significantly reduced wing twist, lower induced drag, and lighter spar weight. According to a preferred embodiment, potential uses of curved front spar 18 for a sail wing include high altitude deployable airplanes and hang gliders.

Figure 2:
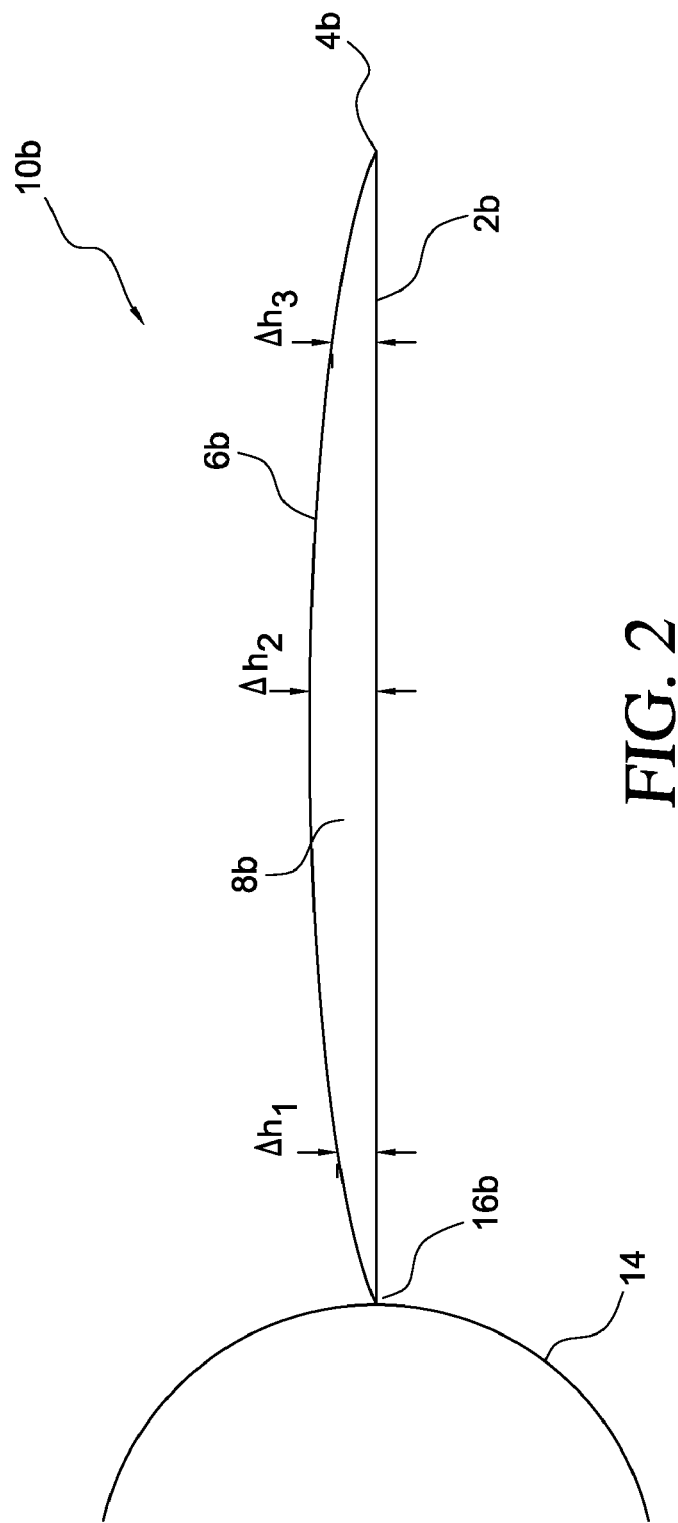
FIG. 2 illustrates a rear view of the conventional sail wing as shown in FIG. 1.

FIG. 1 illustrates an oblique view of conventional sail wing 10b from the root of conventional sail wing 10b, with sample cross sections 12a-e, showing how the trailing edge curve results in a substantial twist in conventional sail wing 10b, which, in turn, results in poor aerodynamic performance, and FIG. 2 illustrates a rear view of conventional sail wing 10b shown in FIG. 1. FIG. 1 illustrates a view of a right wing panel, with the center of conventional sail wing 10b at the lowermost portion of the page. The left wing is not shown. Further shown in FIG. 1 as part of conventional sail wing 10b is sail wing material 8, which, as those of ordinary skill know, can include plastic films, various types of cloth, among many other types of materials. Located at a far end of conventional sail wing 10 can be wingtip spar 4, which, if present, can be a solid material, such as whatever material conventional front spar 2 is made of, or it can be a different material. Alternatively, according to an exemplary embodiment, there does not have to be a wing tip spar 4 attached to curved front spar 18. If, for example, conventional sail wing 10 is fabricated from sail material 8, trailing edge cable 6 can be simply attached to the trailing edge of conventional sail wing 10 along nearly or all of its entire length, with no wing tip spar 4.

Figure 3:
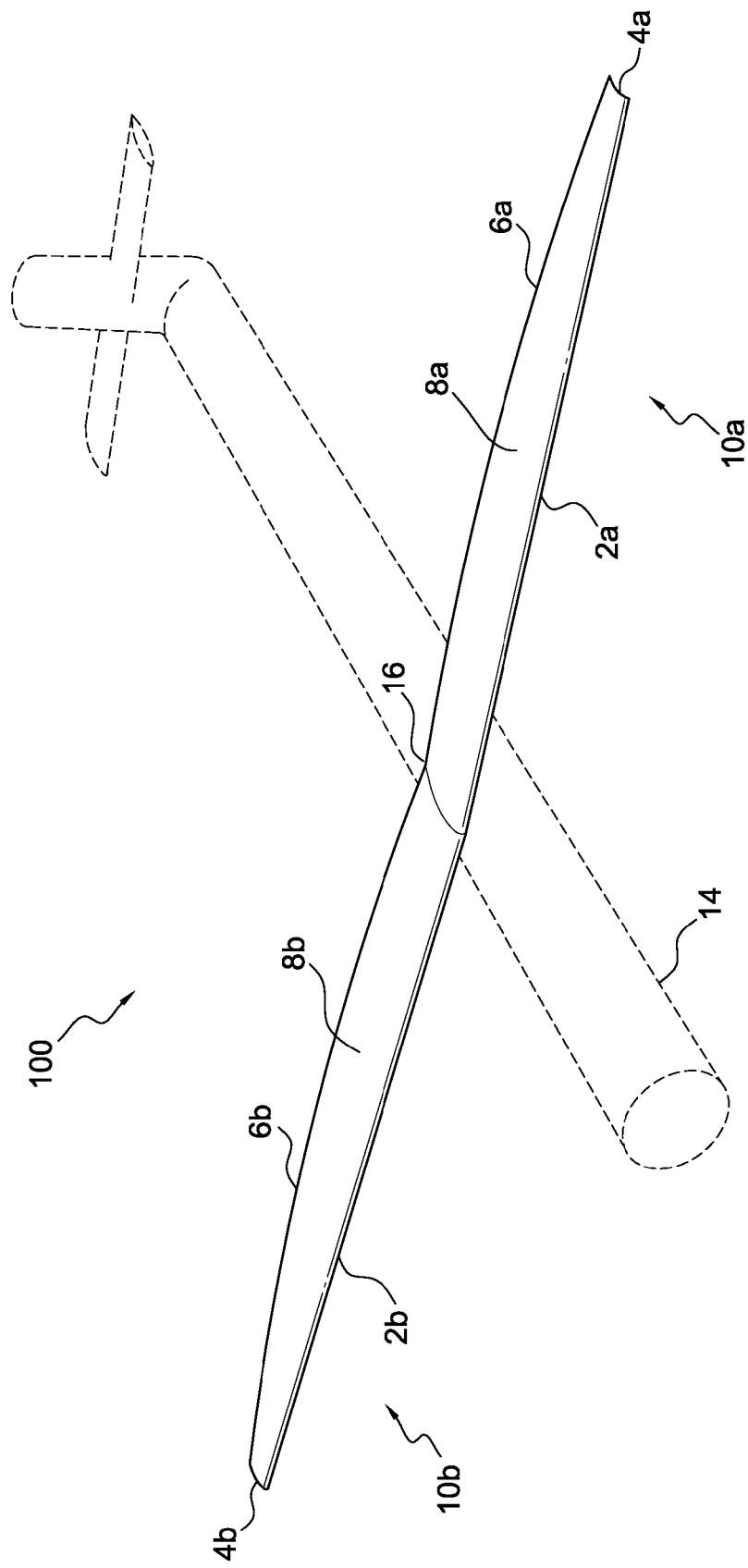
FIG. 3 illustrates a front perspective view of the conventional sail wing shown in FIG. 1.

FIG. 2 illustrates a rear view of conventional sail wing 10b as shown in FIG. 1. In FIG. 2, trailing edge cable 6b induces a significant curve in conventional sail wing 10b because the tension in trailing edge cable 6b is limited. As those of ordinary skill in the art can appreciate, front spars 2a, b are substantially straight and flat, although not perfectly so. In comparison with trailing edge cable 6, however, conventional front spar 2 is substantially flat, as FIG. 2 illustrates. Because the tension in trailing edge cable 6 is finite, a curve is induced into the trailing edge of conventional sail wing 10, which causes a plurality of differences in height $\Delta h1$, $\Delta h2$, and $\Delta h3$ (among others) between the leading edge with front spar 2, and the trailing edge (trailing edge cable 6). As those of ordinary skill in the art can further appreciate, because the trailing edge of conventional sail wing 10 is not uniform and is not linear, lift is decreased and drag increased, thereby negatively affecting performance of conventional sail wing 10. As those of ordinary skill in the art can appreciate, the tension load created in conventional sail wing 10 resulting from lift and flight forces can be concentrated in a trailing edge cable 6, or, if there is no trailing edge cable 6, then the tension load would be distributed throughout sail wing material 8, but would be concentrated at the trailing edge of sail wing material 8. FIG. 3 illustrates a front perspective view of light weight aircraft 100 and conventional sail wings 10a, b, showing the effect of curved trailing edge cable 6 on both left and right conventional sail wings 10a, b.

Figure 5:
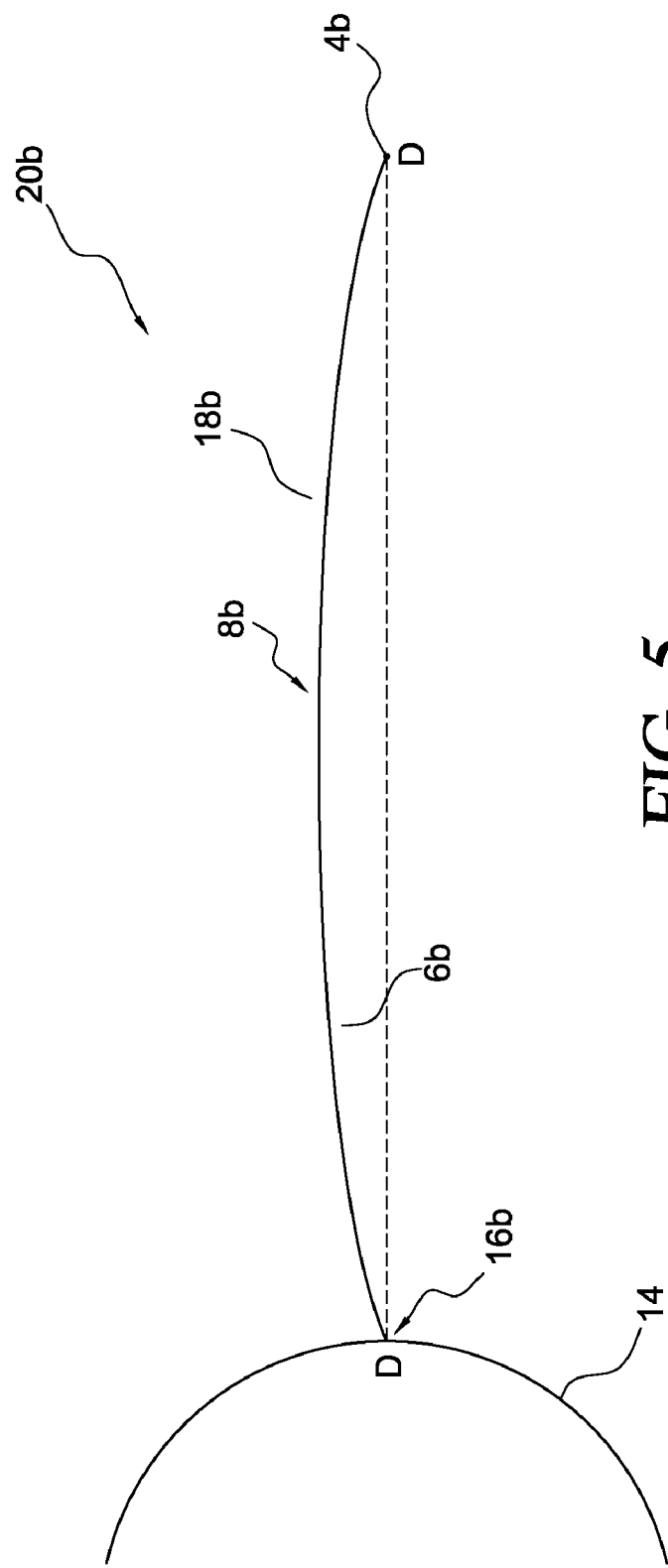
FIG. 5 illustrates a rear view of the curved sail wing according to an embodiment of the present invention.

FIG. 4 illustrates an oblique view of right curved sail wing 20b with curved front spar 18, wherein the front spar is pre-curved to match the curve of tensioned trailing edge cable 6 according to an exemplary embodiment, and FIG. 5 illustrates a rear view of curved sail wing 20 according to a further exemplary embodiment.

FIG. 4 is essentially the same sail wing as that as shown in FIGS. 1-3, for purposes of comparison with a significant difference. According to an exemplary embodiment, the front spar is per-curved (curved front spar 18) to substantially match the curve of tensioned trailing edge cable 6 according to an exemplary embodiment. As FIGS. 4 and 5 illustrates (FIG. 5 is a rear view of curved sail wing 20b), there is substantially little or no twist in curved sail wing 20. Curved sail wing cross sections 22a-e are at a substantially uniform angle of attack (as shown in FIG. 4) in terms of twist (i.e., there is substantially no twist), as opposed to conventional sail wing cross sections 12a-e, which show different twist between conventional sail wing cross sections 12a-e. As a result of curved front spar 18, curved sail wing cross sections 22a-e are at a substantially uniform or constant angle of attack, and therefore curved sail wing 20 provides better aerodynamic performance than conventional sail wing 20. According to a preferred embodiment, one specific performance characteristic that can be improved is induced drag, which, according to an exemplary embodiment, is minimized through implementation of curved front spar 18. According to an exemplary embodiment, the induced drag can be reduced by as much as between about 15% to about 20%. Induced drag is decreased because the twist is now whatever the designer has intended, based on the mutual design of the spar and the sail itself (i.e., curved wing 20a, b). If desired, a wing with zero twist could be produced. Curved wing 20a, b therefore appears aerodynamically better and can produce more lift, with greater efficiency, and less induced drag. In the conventional sail wing, the twist is located close to the center of the wing panel, thereby decreasing its efficiency and its induced drag is higher than curved sail wing 20. Curved front spar 18 can be made from composite material, metal, wood, among other types of materials, or combinations thereof.

Figure 6:
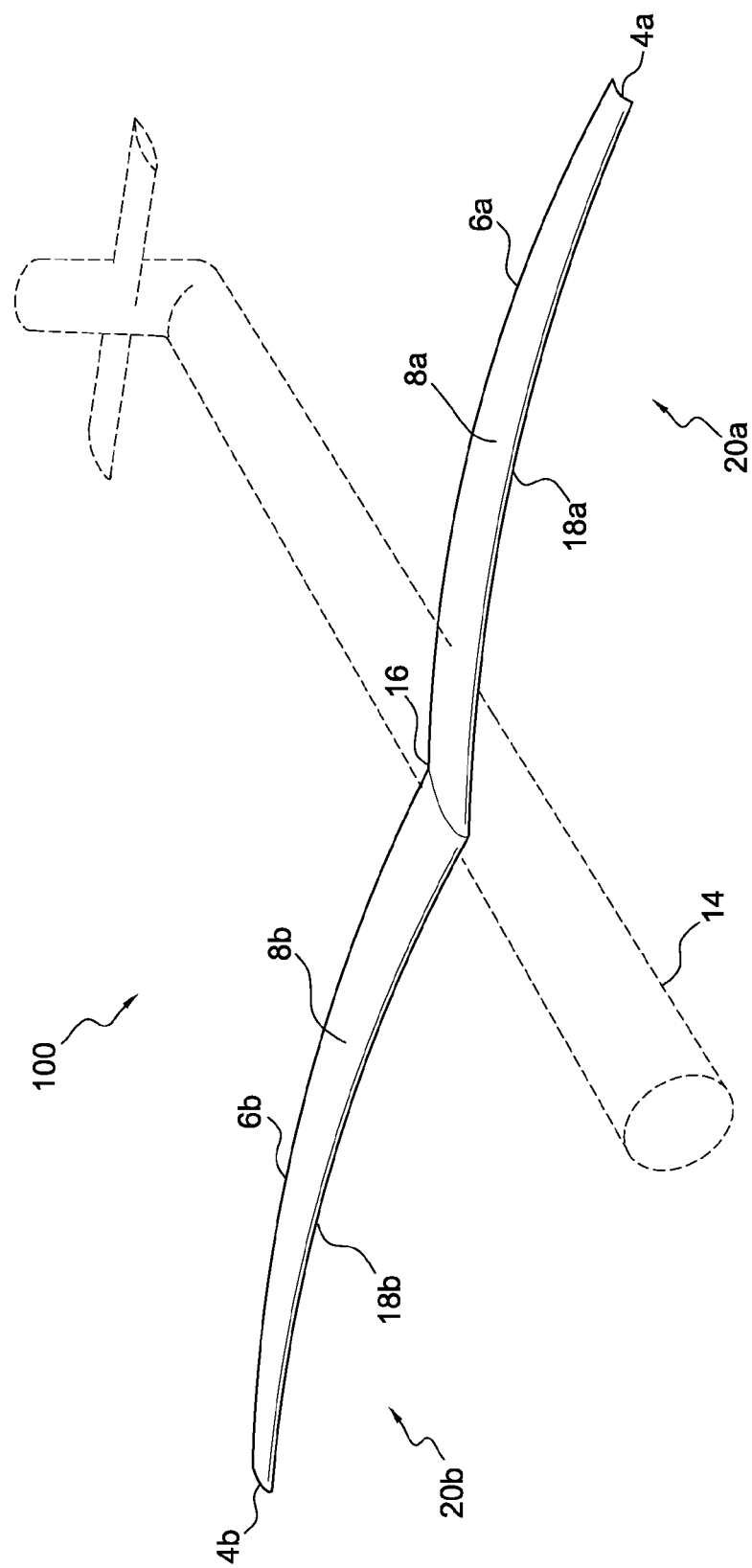
FIG. 6 illustrates a front perspective view of the curved sail wing shown in FIGS. 4 and 5.
Figure 7:
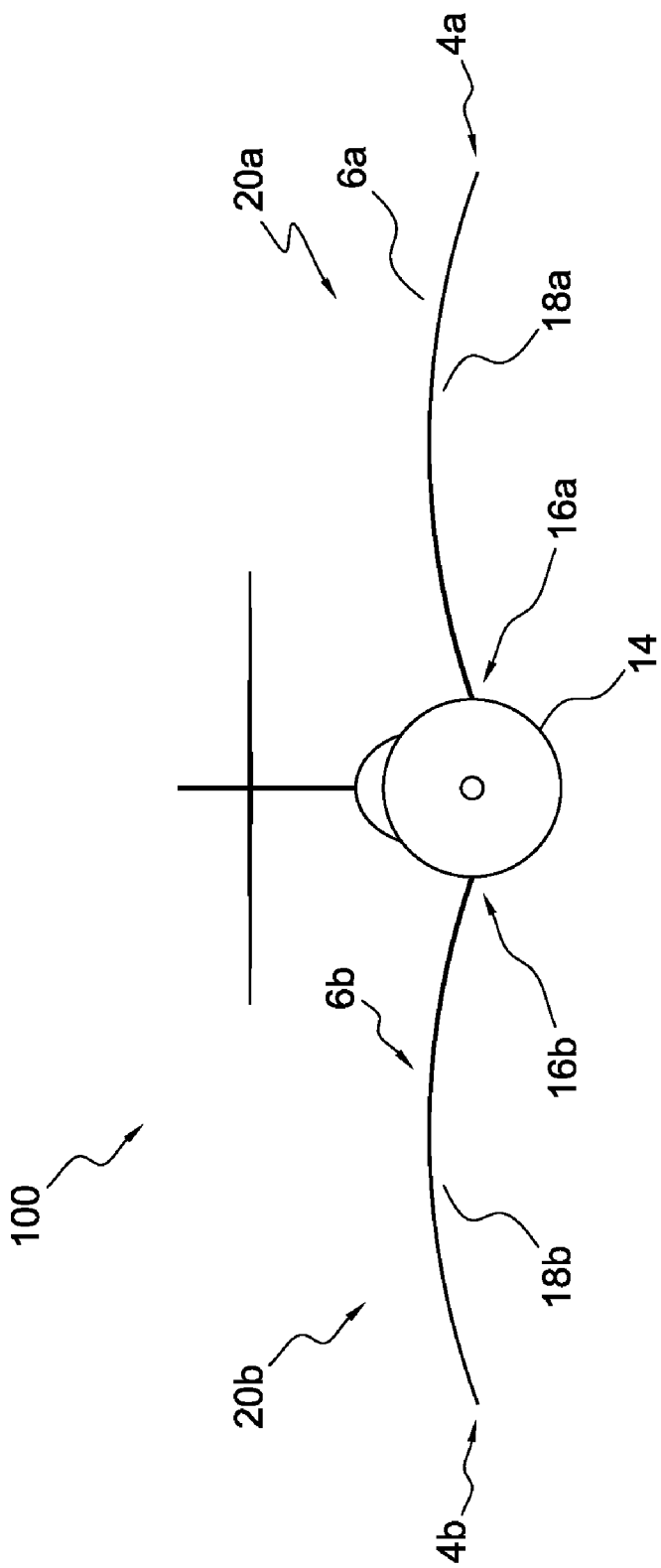
FIG. 7 illustrates a front view of an aircraft with the curved sail wing as shown in FIGS. 4-6 according to an embodiment of the present invention.

FIG. 6 illustrates a front perspective view of curved sail wing 20 as shown in FIGS. 4 and 5, and FIG. 7 illustrates a front view of aircraft 100 with curved sail wing 20 as shown in FIGS. 4-6 according to an exemplary embodiment. The curve induced into curved front spar 18 matches the curve created in trailing edge cable 6 during certain flight conditions, in order to maximize flight and aerodynamic performance over the widest possible range of flight conditions. According to a preferred embodiment, the curve of curved front spar 18 is a catenary curve. The shape of curved front spar 18 can be preferably determined by the aircraft or sail wing designer, considering, among other factors, the aerodynamic loads, the allowable tension in the trailing edge cable, the type of material in the sail itself, the desired wing airfoils, and any desired twist in the wing. The design of curved front spar 18 can be preferably (though by no means exclusively), obtained through a computer program specifically written to combine the analysis of all factors involved (the non-limiting listing of which appears above), or it can be done by experimental iteration or a combination of both.

According to further exemplary embodiment, the curve of curved front spar 18 can also be parabolic, hyperbolic, or, under certain circumstances, circular. According to a further exemplary embodiment, the curvature of curved front spar 18 can be asymmetric. According to still further exemplary embodiments, the curve of curved front spar 18 can be substantially parabolic, substantially hyperbolic, or substantially circular. According to still another exemplary embodiment, the curve of curved front spar 18 is determined by taking into account the aerodynamic forces applied to curved sail wing 20, and determining which configuration provides a substantially equal amount of aerodynamic forces and the load on the curved sail wing 20. As such, designing the exact shape of curved front spar 18 is both an iterative process and one heavily dependent upon the above described factors and the intended use of the aircraft. However, according to a further exemplary embodiment, through use of curved front spar 18, the loads imposed on curved sail wing 20 decrease by a factor that ranges from between about 2 to about 15, and according to a preferred embodiment, the loads imposed on curved sail wing 20 decrease by a factor of about 10. Thus, substantial structural weight savings can be realized through use of curved front spar 18 according to a preferred embodiment. As shown in FIG. 7, curved front spar 18 is concave downward, but according to another exemplary embodiment, curved spar 18 can be combined either positive dihedral or negative dihedral (anhedral). According to further exemplary embodiments, curved front spar 18 can be combined with a polyhedral wing as well.

The present invention has been described with reference to certain exemplary embodiments thereof. However, it will be readily apparent to those skilled in the art that it is possible to embody the invention in specific forms other than those of the exemplary embodiments described above. This may be done without departing from the spirit and scope of the invention. The exemplary embodiments are merely illustrative and should not be considered restrictive in any way. The scope of the invention is defined by the appended claims and their equivalents, rather than by the preceding description.

All United States patents and applications, foreign patents, and publications discussed above are hereby incorporated herein by reference in their entireties.

What is claimed is:

1. A sail wing for an aircraft comprising:
   a front spar;
   a sail wing membrane attached to the front spar; and
   a tensioned rear wire attached to a trailing edge of the sail wing membrane, such that when the front spar includes a curve that matches a curve of the tensioned trailing edge of the sail wing membrane, the sail wing membrane has substantially little or no twist along a span of the sail wing membrane, the front spar curve being substantially concave when viewed from below the front of the aircraft, and wherein
   the front spar is pre-curved to substantially match the shape of the trailing edge curve so that plural curved sail wing cross sections are at a substantially uniform angle of attack.

2. The sail wing for an aircraft according to claim 1, wherein the front spar comprises a composite material having a molded pre-curve.

3. The sail wing according to claim 1, wherein the front spar comprises a metal material having the pre-curve formed therein.

4. The sail wing according to claim 1, wherein the curve of the front spar is configured to substantially minimize induced drag that results from twisting of the sail wing membrane.

5. The sail wing according to claim 1, wherein the front spar comprises a wood material having the pre-curve formed therein.

6. The sail wing according to claim 1, wherein the front spar pre-curve comprises a substantially catenary curve.

7. The sail wing according to claim 1, wherein the front spar pre-curve comprises a substantially parabolic curve.

8. The sail wing according to claim 1, wherein the front spar pre-curve comprises a substantially hyperbolic curve.

9. The sail wing according to claim 1, wherein the front spar pre-curve comprises a substantially circular curve.

10. The sail wing according to claim 1, wherein the front spar pre-curve comprises a curve that takes into account aircraft design criteria selected from the group consisting of aerodynamic loads, allowable tension in the tensioned rear wire, a type of material the sail wing is made of, one or more wing airfoils, and a twist in the wing.

11. The sail wing according to claim 1, wherein the front spar pre-curve comprises a curve that takes into account aircraft design criteria comprising: aerodynamic loads; allowable tension in the tensioned rear wire; a type of material the sail wing is made of; one or more wing airfoils, and a twist in the wing.

12. A lightweight aircraft, comprising:
    a fuselage; vertical control surfaces appended to the fuselage;
    horizontal control surfaces appended to the fuselage; and
    a wing structure appended to the fuselage, wherein the wing structure includes a pre-curved front spar; a wing structure membrane attached to the front spar; and a tensioned rear wire attached to a trailing edge of the wing structure membrane, such that when the front spar is pre-curved to match a curve of the tensioned trailing edge of the wing structure membrane, the wing structure membrane has substantially little or no twist, the front spar curve being substantially concave when viewed from below the front of the aircraft, and wherein
    the front spar is pre-curved to substantially match the shape of the trailing edge curve so that plural curved sail wing cross sections are at a substantially uniform angle of attack.

13. The lightweight aircraft according to claim 12, wherein the front spar comprises a composite material having a molded pre-curve.

14. The lightweight aircraft according to claim 12, wherein the front spar comprises a metal material having the pre-curve formed therein.

15. The lightweight aircraft according to claim 12, wherein the pre-curve of the front spar is configured to substantially minimize induced drag that results from twisting of the wing structure membrane.

16. The lightweight aircraft according to claim 12, wherein the front spar comprises a wood material having the pre-curve formed therein.

17. The lightweight aircraft according to claim 12, wherein the front spar pre-curve comprises a substantially catenary curved shape.

18. The lightweight aircraft according to claim 12, wherein the front spar pre-curve comprises a substantially parabolic curved shape.

19. The lightweight aircraft according to claim 12, wherein the front spar pre-curve comprises a substantially hyperbolic curved shape.

20. The lightweight aircraft according to claim 12, wherein the front spar pre-curve comprises a substantially circular curved shape.

21. The lightweight aircraft according to claim 12 wherein the lightweight aircraft comprises a solar-powered aircraft.

22. The lightweight aircraft according to claim 12 wherein the lightweight aircraft comprises a glider.

23. The lightweight aircraft according to claim 12 wherein the lightweight aircraft comprises an ultra-light aircraft.

24. The lightweight aircraft according to claim 12, wherein the wing structure further comprises one or more additional tensioned rear wires attached to the trailing edge of the wing structure membrane.

25. A sail wing for an aircraft comprising:
   a front spar; and
   a tensioned sail wing membrane attached to the front spar, such that when the front spar includes a curve that matches a curve of the tensioned trailing edge of the tensioned sail wing membrane, the tensioned sail wing membrane has substantially little or no twist along a span of the tensioned sail wing membrane, the front spar curve being substantially concave when viewed from below the front of the aircraft, and wherein
   the front spar is pre-curved to substantially match the shape of the trailing edge curve so that plural curved sail wing cross sections are at a substantially uniform angle of attack.

26. The sail wing according to claim 25, wherein the pre-curve of the front spar is configured to substantially minimize induced drag that results from twisting of the tensioned sail wing membrane.

* * * * *